United States Patent [19]
McCullough, Jr. et al.

[11] Patent Number: 5,712,344
[45] Date of Patent: Jan. 27, 1998

[54] MODIFIED POLYPROPYLENE IMPACT COPOLYMER COMPOSITIONS

[75] Inventors: James Douglas McCullough, Jr., Houston; Jackson Gordon Bowers, Simonton, both of Tex.

[73] Assignee: Union Carbide Chemicals & Plastics Technology Corporation, Danburt, Conn.

[21] Appl. No.: 582,749

[22] Filed: Jan. 4, 1996

[51] Int. Cl.$^6$ .................................................. C08L 53/00
[52] U.S. Cl. ............................................. 525/88; 525/89
[58] Field of Search ..................................... 525/88, 89

[56] References Cited

U.S. PATENT DOCUMENTS

| | | | |
|---|---|---|---|
| 3,231,635 | 1/1966 | Holden et al. | 525/271 |
| 3,265,765 | 8/1966 | Holden et al. | 528/271 |
| 3,322,856 | 5/1967 | Holden et al. | 525/99 |
| 3,514,501 | 5/1970 | Leibson et al. | 525/53 |
| 3,700,633 | 10/1972 | Wald et al. | 525/339 |
| 4,379,759 | 4/1983 | Goeke et al. | 502/104 |
| 4,426,495 | 1/1984 | Vitus et al. | 525/92 |
| 4,444,953 | 4/1984 | St. Clair | 525/98 |
| 4,728,705 | 3/1988 | Nestlerode et al. | 526/125 |
| 4,904,731 | 2/1990 | Holden et al. | 525/98 |
| 5,118,757 | 6/1992 | McCullough et al. | 525/53 |
| 5,250,631 | 10/1993 | McCullough, Jr. et al. | 525/322 |
| 5,362,782 | 11/1994 | McCullough, Jr. et al. | 524/108 |

FOREIGN PATENT DOCUMENTS

| | | |
|---|---|---|
| 0430490A2 | 6/1991 | European Pat. Off. . |
| 0509662A1 | 10/1992 | European Pat. Off. . |
| 2281302 | 3/1995 | United Kingdom . |

OTHER PUBLICATIONS

Abstract No. 87–133454/19 of Japanese Patent Document No. J62074951-A (Chisso Corp.).

Abstract No. 91–257265/35 of Japanese Patent Document No. J03168237-A (Idemitsu Petrochem KK).

Abstract No. 88–184255/27 of Japanese Patent Document No. JP92080060-B (Chisso Corp.).

Abstract No. 92–125329/16 of European Patent Document No. 480,698-A (ICI Australia Opera).

Abstract No. 94–012506/02 of Japanese Patent Document No. 05320470-A (Tonen Sekiyu Kagaku KK).

Abstract No. 87–008994/02 of Japanese Patent Document No. 94004737-B2 (Idemitsu Peterochem KK).

*Primary Examiner*—Mark L. Warzel
*Attorney, Agent, or Firm*—A. S. Reiskind

[57] ABSTRACT

Modified polypropylene impact copolymer compositions containing a base polypropylene impact copolymer and a certain modifier have good impact strength, toughness and resistance to stress whitening. The modifier includes a hydrogenated block copolymer having at least one polymeric block of predominantly polymerized monoalkenyl aromatic hydrocarbon monomer units and at least one polymeric block of predominantly polymerized conjugated diolefin monomer units. The modifier may additionally contain a polyethyleneic ethylene-α-olefin copolymer.

24 Claims, No Drawings

1

MODIFIED POLYPROPYLENE IMPACT COPOLYMER COMPOSITIONS

FIELD OF THE INVENTION

This invention relates generally to modified polypropylene impact copolymer compositions. More particularly, the invention relates to modified polypropylene impact copolymer compositions comprising a base polypropylene impact copolymer and a modifier, wherein the modifier comprises a hydrogenated block copolymer having at least one polymeric block of predominantly polymerized monoalkenyl aromatic hydrocarbon monomer units and at least one polymeric block of predominantly polymerized conjugated diolefin monomer units. The modifier may additionally contain a polyethylenic ethylene-α-olefin copolymer or terpolymer of high ethylene content. The modified polypropylene impact copolymer compositions according to the invention have improved stress whitening resistance, impact strength and stiffness and are particularly useful for making objects such as furniture and containers.

BACKGROUND OF THE INVENTION

Polypropylene compositions have gained wide commercial acceptance and usage in numerous commercial applications because of the relatively low cost and desirable properties of polypropylene. In general, polypropylene polymers, particularly polypropylene homopolymers, have the disadvantages of being brittle and having low impact resistance, particularly at low temperatures. Numerous procedures have been proposed for modifying the polypropylene homopolymers to improve their properties. Many of those proposals have involved incorporating a propylene/α-olefin copolymer portion in an otherwise homopolymeric polypropylene.

For example, Liebson et al., U.S. Pat. No. 3,514,501, describes a process for making block copolymers wherein a homopolymeric polypropylene prepolymer is produced and a block which has at least one other α-olefin is grown from the prepolymer in a second polymerization step. Another approach involves mixing a polypropylene homopolymer with a propylene/ethylene copolymer. Some commercial polypropylene products of high impact strength have been made by a process involving the production of a homopolymer phase, usually a polypropylene homopolymer, and the subsequent production of a copolymer phase in the presence of the homopolymer phase which still contains active polymerization sites. Whether the resulting product is a true block copolymer, a mixture of homopolymer and copolymer or of some other structure is not entirely clear. Those compositions are often referred to as "polypropylene impact copolymers," regardless of their precise structure, and will be referred to as such for the purposes of this invention.

Polypropylene impact copolymers are sometimes blended with other polymers to improve certain properties. In some instances, such blends are made to improve stress whitening resistance. Stress whitening is primarily of cosmetic importance and is itself a form of minimal damage to the outward surface of fabricated articles. Such blemishes or blush marks are a normal consequence of impacting or bending of fabricated parts. For example, McCullough, Jr. et al., U.S. Pat. No. 5,362,782, describes stress whitening resistant polypropylene impact copolymer compositions which contain a homopolymer phase containing at least 94% polypropylene, a copolymer phase containing a copolymer of ethylene and propylene and a nucleating agent. McCullough, Jr. et al., U.S. Pat. No. 5,250,631, describes additional stress whitening resistant polypropylene impact copolymer compositions which contain a homopolymer phase of predominantly homopolymeric polypropylene and a terpolymer phase having a major proportion of ethylene, a minor proportion of an α-olefin of at least 4 carbon atoms and a minor proportion of propylene. Neither of these references refers to a polypropylene impact copolymer composition containing a modifier as employed in the present invention.

Holden et al., U.S. Pat. No. 4,904,731, discloses a modifier which is added to a random copolymer of ethylene and propylene to produce a random copolymer composition of improved stress whitening resistance. That modifier contained a hydrogenated block copolymer containing at least two polymeric blocks containing predominantly monoalkenyl aromatic hydrocarbon monomer units and at least one block containing predominantly hydrogenated, conjugated diolefin monomer units, and a linear low density polyethylene (LLDPE). Holden et al. did not employ the modifier in a polypropylene impact copolymer as used in the present invention.

These prior art compositions lack the advantage of having good stress whitening resistance while maintaining high impact strength and stiffness, with a minimal addition of a modifier to the base polymer composition. A need exists in the art of polypropylene compositions for a modified polypropylene composition which requires only a low level of added modifier to provide optimal stress whitening resistance, impact strength and stiffness.

SUMMARY OF THE INVENTION

The invention provides novel modified polypropylene impact copolymer compositions. More specifically, the invention relates to modified polypropylene impact copolymer compositions containing a base polypropylene impact copolymer blended with a relatively small amount of modifier. The base polypropylene impact copolymer comprises a homopolymer phase of predominantly homopolymerized polypropylene and a copolymer phase of copolymerized ethylene and propylene, and the modifier comprises (i) a hydrogenated block copolymer comprising at least one polymeric block containing predominantly polymerized monoalkenyl aromatic hydrocarbon monomer units and at least one block of predominantly polymerized conjugated diolefin monomer units, and optionally (ii) a polyethyleneic ethylene-α-olefin copolymer or terpolymer of high ethylene content.

DETAILED DESCRIPTION OF THE PREFERRED EMBODIMENTS

The compositions of the present invention are modified polypropylene impact copolymer compositions comprising a base polypropylene impact copolymer and a modifier. The inventive modified polypropylene impact copolymer compositions are particularly useful in molding and extrusion applications where good stress whitening resistance, impact strength and stiffness are required, even at low temperatures.

The base polypropylene impact copolymer in the inventive composition may be prepared by methods employing conventional polymerization techniques, including gas phase, solvent, slurry, and combinations of such techniques. The base polypropylene impact copolymer compositions of the invention are preferably produced in the gas phase in the presence of a high activity, stereoregular olefin polymerization catalyst by methods which are broadly conventional.

Such polymerization catalysts are also broadly known and conventional and are employed in the polymerization of α-olefins of three or more carbon atoms to produce stereoregular products. In terms conventionally employed to describe such catalysts, the high activity stereoregular catalysts contain as a first constituent a procatalyst which is a titanium-containing solid, usually a titanium-halide containing solid, and which often contains an electron donor. Suitable electron donors which may be used in the production of the procatalyst are ethers, esters, ketones, phenols, amines, amides, imines, nitrites, phosphines, arsines, phosphoramides or alcoholates. Among the preferred electron donors for use in the production of the procatalyst are phenols and esters, particularly alkyl esters of aromatic carboxylic acids. The use of ethyl benzoate or diisobutyl phthalate is particularly preferred. The second catalyst component is an organoaluminum compound which is uncomplexed or is partly or totally complexed with the third catalyst component which is conventionally termed a selectivity control agent. Typical selectivity control agents include esters, particularly aromatic esters, amines, particularly hindered mines, phosphates, phosphites, hindered phenols, silanes and particularly alkoxysilanes and aryloxysilanes and mixtures thereof. Alkyl esters of aromatic carboxylic acids such as ethyl p-ethylbenzoate, ethyl p-ethoxybenzoate and diisobutyl phthalate and alkoxysilanes such as propyltrimethoxysilane and dicyclopentyldimethoxysilane are preferred as the third catalyst component.

Such selectivity control agents may be added to the first reactor or to two or more reactors in a multi-reactor train, and their selection may depend on one or more desirable features, e.g., high stereoselectivity or other properties of the product of each reactor to which it is added. Further, the selection of a selectivity control agent may differ depending upon the reactor to which it is added and the composition produced therein.

Such stereoregular olefin polymerization catalysts are described in numerous patents and other references including Nestlerode et al., U.S. Pat. No. 4,728,705. Although a variety of chemical compounds are useful as constituents of the polymerization catalyst, a typical high activity stereoregular olefin polymerization catalyst contains a procatalyst of magnesium halide, a titanium halide and an electron donor. The halide moieties of such procatalysts are customarily chloride moieties. The cocatalyst is typically a trialkylaluminum compound such as triethylaluminum or triisobutylaluminum, which is often at least partially complexed with the selectivity control agent. Use of the catalysts of this type results in a stereoregular polymeric product when olefins of three or more carbon atoms are polymerized. The catalysts are recognized as high activity if they catalyze the production of polymers of desirable properties without the necessity of removing catalyst residues in a de-ashing step.

These catalysts are used in conventional processes to polymerize or copolymerize α-olefins. The processes may employ a liquid non-polymerizable diluent or, alternatively, may employ a monomer of the polymerization as a liquid diluent. To obtain the compositions of the invention, however, it is desirable to utilize a gas phase process. A number of gas phase processes are known and conventional, including the fluidized bed, gas phase reaction described by Goeke et al., U.S. Pat. No. 4,379,759, the disclosure of which is incorporated herein by reference.

A gas phase polymerization process is typically operated by charging to a suitable reactor an amount of pre-formed polymer particles and lesser amounts of catalyst components. The olefin or olefins to be polymerized are passed as a gas through the particle bed under polymerization conditions at a rate sufficient to initiate polymerization. Upon passing through the particle bed, the unreacted gas is withdrawn from the reactor and recycled together with make-up feed gas. As the catalyst is lost through incorporation of minute amounts of catalyst within the polymer product, additional catalyst is provided to the reactor, often through the use of an inert transport gas such as nitrogen or argon. The reaction temperature is selected to be below the sintering temperature of the polymer particles and is controlled by an external heat exchanger in a gas cycle loop. The reaction temperature is in the range of about 30° C. to about 120° C., preferably from about 50° C. to about 90° C. The reaction pressure is generally up to about 1000 psi, although reaction pressures from about 100 psi to about 400 psi are preferred. The precise control of reaction conditions as well as the addition of catalyst and feed gas and the recycle of unreacted monomer is within the skill of the art. An additional means of reaction and product control is achieved by a provision for the addition of molecular hydrogen to the reactor and thus the reaction system. The addition of molecular hydrogen serves to control the molecular weight of the product, most likely by serving as a chain transfer agent. The use of molecular hydrogen to control the molecular weight of the polymer is also within the skill of the art.

The desired polymeric products are obtained as particulate matter formed by growth of polymer product on the polymer particles provided to the fluidized bed or as particles formed in the reactor. The polymer particles are removed from the reactor at a rate which is substantially equivalent to the rate of polymer production and the particles are passed to a subsequent reaction zone or are finished by conventional methods prior to use.

It is conceivable, although impractical, to produce the base polypropylene impact copolymers of this invention in a single reactor by control of the feed gas and recycle of unreacted monomer and polymeric product. However, it is more common to operate the gas phase process for production of the base polypropylene impact copolymers as a two-stage process wherein each stage operates substantially in the gaseous phase in one or more separate reactors. In such a process, the homopolymeric portion of the base impact copolymer is initially produced in a suitable gas phase reactor which generally employs molecular hydrogen to control the molecular weight of the product. This initial homopolymer product which has active catalyst sites is then passed to a second gas phase reactor containing a second fluidized bed. A portion of unreacted monomer from the first reaction stage, or from other sourcing, may be passed to the second stage where it is joined by ethylene in an amount needed to prepare the copolymer phase of the base polypropylene impact copolymer. The copolymer phase is of high ethylene content and is at least moderately crystalline in terms of polyethyleneic-type crystallinity, yet it is not so crystalline as high density polyethylene (HDPE). Such a copolymer phase is also termed the "rubber phase" when reference is made to impact polypropylene. The production of the rubber phase takes place in the second reaction stage where it may also be desirable to provide molecular hydrogen to control its molecular weight. In the two-stage gas phase polymerization process, two or more gas phase homopolymer or copolymer reactors can be used in various sequential or parallel arrangements known in the art.

The homopolymer phase of the base polypropylene impact copolymer compositions is predominantly but not necessarily entirely homopolymer. To obtain particular properties, it may be desirable to incorporate in the otherwise homopolymeric portion of the impact copolymer compositions a small amount, e.g., up to about 6% by weight, of a second α-olefin having up to 4 carbon atoms inclusive, such as ethylene or 1-butene. The incorporation of the optional small amounts of second α-olefin is by conventional methods and serves to modify but not substantially alter the properties of the homopolymer phase. In the embodiments where a small amount of second α-olefin is incorporated, although technically a copolymer, the product is still referred to as the homopolymer phase. The optional second olefin is preferably ethylene, preferably incorporated in an amount up to about 2% by weight, with from about 4% by weight to about 6% being more preferred. However, the homopolymer phases which are substantially homopolymeric polypropylene, i.e., phases produced in the substantial absence of second α-olefin, are most preferred.

The copolymer phase, or rubber phase, of the polypropylene impact copolymer predominantly comprises ethylene and propylene, although small amounts of other α-olefin moieties could optionally be present. Through control of the proportion of unreacted propylene and the proportion of ethylene provided to the copolymerization reactor, it is possible and conventional to vary the proportion of ethylene in the ethylene/propylene copolymer phase. In the compositions of the present invention, the limits on ethylene content are significant since polypropylene impact copolymers of too low an ethylene content in the rubber fraction lack the needed level of protection against stress whitening and too high an ethylene content in the rubber fraction results in brittle failure. The proper level of ethylene can be determined by infrared analysis through conventional means, and the presence of polyethyleneic-type crystallinity can be ascertained by virtue of strong absorption near or at 729 $cm^{-1}$ in the infrared spectrum, with C. Tosi and F. Ciampelli, "Applications of Infrared Spectroscopy to Ethylene-Propylene Copolymers," *Advances in Polymer Science*, vol. 12, p. 97, Springer-Verlag (1973) being an appropriate reference.

In the polypropylene impact copolymers of the invention, the proportion of ethylene in the copolymer (rubber) phase is preferably from about 77% by weight to about 90% by weight based on total copolymer phase, more preferably from about 79% by weight to about 85% by weight based on total copolymer phase, and most preferably from about 80% by weight to about 83% by weight based on total copolymer phase. The copolymer phase is present in an amount from about 20% by weight to about 50% by weight of the total base polymer composition. Proportions of the copolymer phase from about 25% by weight to about 45% by weight of the total base polymer composition are preferred and proportions from 30% by weight to about 40% by weight of the total base polymer composition are more preferred.

In the invention, the base polypropylene impact copolymer is blended prior to or during the extrusion step with a relatively small amount of the modifier. The modifier comprises (a) a hydrogenated block copolymer, comprising at least one polymeric block containing predominantly polymerized monoalkenyl aromatic hydrocarbon monomer units and at least one polymeric block containing predominantly polymerized conjugated diolefin monomer units, and optionally (b) a polyethyleneic ethylene-α-olefin copolymer or terpolymer of high ethylene content.

The term "predominantly" in the context of this invention in reference to the block copolymer used as or contained in the modifier defines an amount of at least 85% by weight of the pertinent block copolymer. The other portion of the block copolymer may contain any monomer copolymerizable with the indicated monomer including monomers used in other polymeric blocks of the block copolymer. In a preferred embodiment, the total amounts of block copolymer and optional polyethyleneic ethylene-α-olefin copolymer blended with the base polypropylene impact copolymer is equal to or less than about 14% by weight of the total modification phase, whereby the total modification phase comprises that amount of rubber phase from the base impact polypropylene plus the amounts of block copolymer and optionally any polyethyleneic ethylene-α-olefin copolymer.

The compositions according to the invention may employ any of the selectively hydrogenated block copolymers comprising at least one polymeric block containing predominantly polymerized monoalkenyl aromatic hydrocarbon monomer units and at least one polymeric block containing predominantly polymerized conjugated diolefin monomer units. Suitable block copolymers may be prepared by hydrogenating a block copolymer prepared in accordance with techniques well known in the prior art such as those described in U.S. Pat. Nos. 3,231,635 (Holden et al.); 3,265,765 (Holden et al.); 3,322,856 (Holden et al.); 4,426,495 (Vitus et al.) and 4,444,953 (St. Clair), the disclosures of which are incorporated herein by reference.

In general, block copolymers which may be hydrogenated to form the hydrogenated block copolymers useful in the compositions of this invention will have one of the following general formulae: $B_x$—$(A$—$B)_y$—$A_z$ and $[B_{x'}$—$(A$—$B)_{y'}$—$A_{z'}]_n$—$Z$ wherein A and B are as defined in the aforementioned U.S. Pat. Nos. 3,231,635; 3,322,856; and 4,444,953; x and z are, independently, integers equal to 0 or 1; y is a whole number from 1 to about 25; provided, however, that z+y≧2; x' and z' are independently integers ranging from 0 to 1; y' is a whole number from 1 to 25; n is a whole number from 2 to 30, and Z is the coupling agent nucleus of a star-shaped or linear block copolymer. In general, each polymeric block A may have the same or a different weight average molecular weight within the range from about 4,000 to about 50,000 and each polymeric block B may have the same or a different weight average molecular weight within the range from about 10,000 to about 200,000. In a preferred embodiment, each polymeric block A will have approximately the same weight average molecular weight within the range from about 5,000 to about 10,000 and each polymeric block B will have approximately the same weight average molecular weight within the range from about 25,000 to about 100,000.

In general, the block copolymers useful in the present invention may be hydrogenated using any conventional hydrogenation method known in the prior art. In general, the conditions used to hydrogenate the block copolymers useful in this invention will be selected to insure that at least 50%, preferably at least 80%, and most preferably at least 95% of the ethylenic unsaturation remaining in the conjugated diolefin polymer blocks after preparation is saturated as a result of the hydrogenation. The hydrogenation conditions will also be selected so as to insure that less than 20%, preferably less than 10% and most preferably less than 5% of the aromatic unsaturation in the monoalkenyl aromatic hydrocarbon polymer blocks is hydrogenated.

In general, suitable hydrogenation methods involve the use of a suitable catalyst comprising a Group VI or Group VIII metal atom. Suitable catalysts are described in Wald et al., U.S. Pat. No. 3,700,633, the disclosure of which is incorporated herein by reference. For example, in U.S. Pat. No. 3,700,633, selective hydrogenation is accomplished in the same solvent as is used to effect polymerization with a catalyst prepared by reacting an aluminum alkyl with a nickel or cobalt carboxylate or alkoxide. In general, hydrogenation is accomplished at a temperature within the range of from about 25° C. to about 175° C. at a hydrogen partial pressure below 5,000 psig and preferably within the range from about 250 psig to about 1,500 psig. Also, the use of lower temperatures and lower hydrogen partial pressures generally will reduce the amount of aromatic unsaturation that is hydrogenated.

In a preferred embodiment, the modifier used in the compositions of the invention consists essentially of the block copolymer defined above.

In a further preferred embodiment, the modifier used in the compositions of the invention comprises the block copolymer defined above and a polyethyleneic ethylene-α-olefin copolymer. The polyethyleneic ethylene-α-olefin copolymer offers affinity for the ethylene-propylene copolymer phase of the base polypropylene impact copolymer as a result of a degree of compositional similarity. The α-olefin may generally be propylene, butene-1, hexene-1 or octene-1, or a mixture of any α-olefins having 3 to 12 carbon atoms. The catalyst used to make the polyethyleneic ethylene-α-olefin copolymer may include any of those known in the art, including metallocene catalysts. The process for making the polyethyleneic ethylene-α-olefin copolymer can be any of the conventionally known processes, including gas phase, slurry, solution or high-pressure processes or combinations of these.

Certain of the polyethyleneic ethylene-α-olefin copolymers are categorized into general classes such as linear low density polyethylene (LLDPE) and "very-low" or "ultra-low" density polyethylene, with the latter two respectively designated VLDPE or ULDPE, and being of densities of about 0.900–0.915 g/cm$^3$. A lower density usually correlates with higher α-olefin content. The polyethyleneic ethylene-α-olefin copolymers of this invention have an α-olefin content generally less than 30 mol %.

To avoid any contribution to the composition's brittle character, the polyethyleneic ethylene-α-olefin copolymer preferably has a density less than 0.930 g/cm$^3$, more preferably less than 0.925 g/cm$^3$, and most preferably less than about 0.920 g/cm$^3$. The melt index (ASTM D 1238, Cond. E) of the polyethyleneic ethylene-α-olefin copolymer should be sufficiently high to impart good flow properties, with melt indexes above about 15 dg/min being preferred.

In a preferred embodiment, the hydrogenated block copolymer is used as the sole modification component. Alternatively, the hydrogenated block copolymer and a polyethyleneic α-olefin copolymer are combined prior to blending the modifier components with the base impact polypropylene. This may be done by dry mixing of components, or preferably by compounding in the molten state in batch or continuous mixers. The hydrogenated block copolymer preferably is present in the amount of 30–70% by weight of the modifier; and the polyethyleneic ethylene-α-olefin copolymer is preferably present in the amount of 70–30% by weight of the modifier so prepared.

The compositions according to the invention contain a minor amount of modifier, wherein said modifier is either the hydrogenated block copolymer alone or a melt or dry mixture of hydrogenated block copolymer and polyethyleneic ethylene-α-olefin polymer. The modifier is preferably 0.3–10% by weight of the modified polypropylene impact copolymer composition, and more preferably 0.5–4% by weight of the modified polypropylene impact copolymer composition, and most preferably 1–3% by weight of the modified polypropylene impact copolymer composition.

These polypropylene impact copolymer compositions are prepared through either dry blending followed by melt extrusion, or by metered addition of the modifier to the base impact polypropylene in the course of melt extrusion. A variety of melt compounding devices are known in the art which may be used to fabricate compositions according to the invention to produce finished products.

Products made with the modified polypropylene impact copolymer compositions according to the invention are preferably of superior stress whitening resistance, impact strength and stiffness. Exceptional clarity and low haze combined with good gloss are further preferred properties of the compositions according to the invention where comparisons are made to conventional impact polypropylene materials as are known in the art. The inventive compositions preferably have melt flows (ASTM D 1238 Cond. L) from about 0.2 to about 200 dg/min, with values from about 1 to 50 dg/min preferred, and from about 2 to 40 dg/min more preferred.

The compositions of the present invention may be used to make objects with outstanding stress whitening resistance and excellent mechanical properties, particularly goods where outward appearance is important. For example, the compositions of the present invention would be useful to make molded and extruded articles such as automotive trim parts, furniture, luggage, small appliance housings, crates and trays, and extruded film of high toughness, clarity and gloss. Any of the fabrication technologies known in the art may be applied in the manufacture of finished articles, including injection molding, extrusion, thermoforming and other processes as dictated by fabrication ease, ultimate part geometry and other relevant factors.

The polymeric compositions of the invention may optionally incorporate one or more additives such as stabilizers, antioxidants, fillers, colorants, nucleating agents, clarifiers, antistatic agents and mold release agents which are conventionally employed in commercial polypropylene compositions. They may also be treated with alkyl peroxides or other peroxidic species, such as 2,5-dimethyl-2,5-bis(t-butylperoxy)hexane, in order to gain the rheological characteristics associated with visbroken or partially crosslinked polymers to the extent that the stress whitening resistance is not substantially compromised.

The following Examples are provided to enable those of ordinary skill in the art to make the compositions of the invention. These Examples are not intended to limit the scope of the invention. Efforts have been made to ensure accuracy with respect to numbers used to characterize the measured conditions; however, some experimental errors and deviations may be present. Accordingly, departures may be made from the detail without departing from the spirit or scope of the disclosed general inventive concept.

All components of blends, including modifiers and base polymers, are described in TABLE I. Throughout the Examples, stabilization of the polymers was carried out in like manner through the use of normal levels, that being generally less than 1% total additives, including antioxidants, acid acceptors, mold release agents, antistats and the like. In the tables for Examples I and II, the following abbreviations were used for the various test methods:

ID.=Sample identification number
MOD=Modifier
BASE PP=Base Polypropylene
MF=Melt Flow, dg/min, ASTM D 1238 Cond. L
GARD=Gardner Falling Weight Impact, −30° C., in-lb, ASTM D 5420, Method GC IZOD 23=Notched Izod, 23° C., ft-lb/in, ASTM D 256
IZOD-20=Notched Izod, −20° C., ft-lb/in
SFM=1% Secant Flexural Modulus, 0.05 in/min, psi, ASTM D 790A
SW10=Stress whitening resistance, 10 in-lb of impact, Gardner ring out, 2.5 inch diameter by 0.125 inch thick disk, diameter of white spot opposite impacted side is measured after 24 hours after molding (average of 3 measurements).
SW20=Same as SW10 excepting at 20 in-lb of impact
EXT=Laboratory extruder identification
PASS=Number identifying first or second pass in the extruder

TABLE I

| COMPONENT | DESCRIPTION |
| --- | --- |
| Modifier A | Commercial modifier based on EPDM and HDPE |
| Modifier B | Pre-compounded blend of SEBS-1 (50% w) and LLDPE-1 (50% w) |
| SEBS-1 | ~7,500 MW Polystyrene; (two blocks) ~35,000 MW hydrogenated polybutadiene (one block) |
| LLDPE-1 | Melt Index: 25 dg/min (D 1238 E); Density: 0.917 (D 792) |
| PP-1 | Fraction Rubber: 32% w; Fraction Ethylene in Rubber: 83% w (FTIR) |
| PP-2 | Fraction Rubber: 29% w; Fraction Ethylene in Rubber: 84% w (FTIR) |
| PP-3 | Fraction Rubber: 28% w; Fraction Ethylene in Rubber: 87% w (FTIR) |
| PP-4 | Fraction Rubber: 35% w; Fraction Ethylene in Rubber: 83% w (FTIR) |
| PP-5 | Fraction Rubber: 22% w; Fraction Ethylene in Rubber: 58% w (FTIR) |
| PP-6 | Fraction Rubber: 16% w; Fraction Ethylene in Rubber: 62% w (FTIR) |

EXAMPLE I

Various modified and unmodified polypropylene impact copolymer compositions were prepared having compositions summarized in TABLE II. The modifiers at 2% w were dry blended with the respective base polypropylene impact copolymers and additives, and then extruded under nitrogen on a 30 mm screw diameter Werner & Pfleiderer (W&P) twin-screw extruder with a melt temperature of 230° C. Injection moldings were conducted on an Arburg Model 221-55-250 reciprocating screw, 25 ton clamp, injection molder, using ASTM molding conditions. Standard ASTM testing conditions were used for tabulated test data in this and the other example, excepting that the measure of stress whitening involves an ASTM method variant.

weight (Gardner) impact strength at low temperature and notched Izod impact strength at room temperature. Small differences seen in low temperature notched Izod impact are within experimental error. Along with the general improvements in toughness, sample 42B retains or improves the excellent stress whitening resistance of sample 42 (the base polymer control). In contrast, sample 42A, which contains Modifier A—a blend of EPDM and HDPE— tends to increase the stress whitening (greater diameter) or not improve it over the control and, furthermore, is distinctly worse in stress whitening than sample 42B. In a like manner, comparisons can be made between samples 49, 49A and 49B, with the findings being essentially the same, with the material of the inventive sample 49B being the superior sample.

EXAMPLE II

In this Example, the effects of the amount of Modifier B, base polymer type and compounding history on the modified polypropylene impact copolymer properties were investigated. It is shown that 3% by weight of Modifier B in the base polymer of the appropriate type gives excellent toughness with minimal loss of stiffness (modulus) and at the same time retains excellent stress whitening resistance. Modifier B also reduces adverse effects of recompounding of the base impact polypropylene. Further, the benefits of Modifier B for maintaining or improving excellent stress whitening resistance are shown to be dependent on the choice of base impact polypropylene type. Hence, the selection of the base impact copolymer as well as the selection of the modifier provide advantages to the compositions of the invention. It is also shown that the content of Modifier B expressed as a percent of total modification is important in regard to maximizing its beneficial effect on notched Izod impact concurrent with minimal loss of stiffness.

In TABLE III, comparison can be made between samples 35W, 35WM2 and 35WM3. The latter two represent addition of 2 and 3% by weight Modifier B to PP-3 (powder); thus the three together are direct measures of the effects of modification under the same extrusion conditions. The advantage of 3% by weight Modifier B is clearly seen in the Gardner and notched Izod impact values. At the same time, a slight directional improvement (SW20) in stress whitening resistance is seen relative to the base material (sample 35W). Also, at 2% by weight Modifier B, samples 35S and 35SM show improvement in toughness for addition of the modifier. This is particularly seen for the notched Izod impact strength at room temperature. Different extrusion configurations and conditions on the three laboratory extruders used (Sterling 1.5 inch screw diameter, single-screw extruder, W&P 30 mm screw diameter, twin-screw extruder and Welex, 2.5 inch

TABLE II

| ID | BASE PP | MOD | MF | GARD | IZOD 23 | IZOD-20 | SFM | SW10 | SW20 |
| --- | --- | --- | --- | --- | --- | --- | --- | --- | --- |
| 42 | PP-1 | None | 7.5 | 184 | 1.11 | 0.48 | 157,000 | 0.36 | 0.50 |
| 42A | PP-1 | A | 7.2 | 188 | 1.23 | 0.43 | 150,000 | 0.38 | 0.50 |
| 42B | PP-1 | B | 7.3 | 210 | 1.32 | 0.45 | 150,000 | 0.31 | 0.46 |
| 49 | PP-2 | None | 6.9 | 172 | 1.18 | 0.42 | 151,000 | 0.34 | 0.45 |
| 49A | PP-2 | A | 6.6 | 193 | 1.29 | 0.49 | 146,000 | 0.38 | 0.52 |
| 49B | PP-2 | B | 6.8 | 218 | 1.42 | 0.47 | 147,000 | 0.32 | 0.47 |

A comparison of samples 42, 42A and 42B in TABLE II shows that sample 42B, which contains Modifier B—a blend of SEBS-1 and LLDPE-1—provides the greatest falling screw diameter, single-screw extruder) preclude further substantive comparisons in regard to the effects of modification on properties. However, it is of value to compare where possible the direct effects of compounding and the benefits of Modifier B in that regard. All extrusions were conducted with nitrogen purging.

For these comparisons, sample sets 35S with 35SW, and 37S with 37SW are of interest. It is seen with both sets, that a second extrusion pass or history (on the W&P extruder) substantially reduced the Gardner impact strength. This adverse effect is reversed when Modifier B is included in the second extrusion step (sample 513A). More specifically, sample 513A is analogous to sample 35SW, excepting that sample 513A was extruded on the Welex extruder for both extrusion passes. Comparison of sample 513A with sample 513 clearly shows that the second extrusion pass is beneficial when the modifier is present on the second pass.

While Modifier B is beneficial with base polymers of the invention in terms of maintaining excellent stress whitening resistance, it alone does not provide the desired level of performance. This is most notably seen in comparison of sample 49P with 49PM and sample 47PR with 47PM. With both pairs, Modifier B imparted outstanding toughening characteristics, but stress whitening resistance was not reduced to the preferred level, that being SW10 less than about 0.45 inch and SW20 less than about 0.60 in.

EXAMPLE III

In this Example, a comparison is made between compositions having a modifier of SEBS-1 alone and compositions having a modifier of SEBS-1 and LLDPE-1 (Modifier B). The base polypropylene is PP-7 (8 MF; Fraction Rubber: 33% w; Fraction Ethylene in Rubber: 83% w, by FTIR). All products were stabilized with 750 ppm of phenolic-type stabilizer, 750 ppm of phosphite-type stabilizer, 3000 ppm of glycerol monostearate antistatic agent and 900 ppm of acid neutralizers. It was of interest to also compare addition of modifier and stabilizers/additives simultaneously to the base polymer (Condition M2) to pre-mixing the modifier and base polymer, followed by mixing in the additives in a second step (Condition M1). All such blends were hand tumbled in a LDPE bag under a nitrogen blanket. It should be noted that Modifier B is pelletized, while SEBS-1 exists as fine crumb that is readily broken into powder after passage through an auger feeder. PP-7 was used as a powder for blending purposes.

All materials were extruded on a 30 mm screw diameter W&P twin-screw extruder, under nitrogen purging, with a

TABLE III

| ID | EXT | PASS | BASE PP | MOD | MF | GARD | IZOD 23 | IZOD-20 | SFM | SW10 | SW20 |
|---|---|---|---|---|---|---|---|---|---|---|---|
| 35S | Sterling | 1 | PP-3 | None | ~7.5 | 195 | 1.50 | 0.50 | 160000 | 0.39 | 0.51 |
| 35SM | Sterling | 1 | PP-3 | 2% B | ~7.5 | 200 | 2.18 | 0.50 | 156000 | 0.39 | 0.50 |
| 37S | Sterling | 1 | PP-4 | None | ~8 | 208 | 1.48 | 0.43 | 157000 | 0.38 | 0.50 |
| 35W | W&P | 1 | PP-3 | None | 7.6 | 212 | 1.51 | 0.69 | 158000 | 0.45 | 0.61 |
| 35WM2 | W&P | 1 | PP-3 | 2% B | 7.8 | 207 | 1.87 | 0.73 | 153000 | 0.42 | 0.58 |
| 35WM3 | W&P | 1 | PP-3 | 3% B | 7.8 | 268 | 2.17 | 0.82 | 150000 | 0.42 | 0.56 |
| 35SW | W&P | 2 | PP-3 | None | 7.9 | 161 | 1.44 | 0.61 | 160000 | 0.43 | 0.55 |
| 37SW | W&P | 2 | PP-4 | None | ~8 | 167 | 1.46 | 0.55 | 164000 | 0.40 | 0.54 |
| 35X | Welex | 1 | PP-3 | None | 7.4 | 218 | 1.32 | 0.62 | 154000 | 0.40 | 0.54 |
| 47P | Com.* | 1 | PP-5 | None | 5.0 | 248 | 2.24 | 0.82 | 150000 | 0.70 | 0.81 |
| 507 | Welex | 1 | PP-4 | None | 7.9 | 220 | 1.65 | 0.63 | 154000 | 0.36 | 0.48 |
| 513 | Welex | 1 | PP-3 | 3% B | 8.2 | 233 | 1.60 | 0.65 | 158000 | 0.35 | 0.47 |
| 513A | Welex | 2 | PP-3 | 3% B | 7.6 | 235 | 2.77 | 0.67 | 153000 | 0.33 | 0.44 |
| 49P | Com. | 1 | PP-6 | None | 4.4 | 161 | 1.74 | 0.68 | 198000 | 0.63 | 0.76 |
| 49PM | W&P | 2 | PP-6 | 3% B | 5.6 | 181 | 1.99 | 0.76 | 179000 | 0.59 | 0.72 |
| 47PR** | Com. | 1 | PP-5 | None | 5.0 | 245 | 2.70 | 0.80 | 150000 | 0.64 | 0.77 |
| 47PM | W&P | 2 | PP-5 | 3% B | 6.1 | 292 | 9.55 | 0.86 | 149000 | 0.66 | 0.79 |

*Product compounded at the commercial plant.
**A second independent test of sample 47P.

In TABLE IV, it is shown from data taken from TABLE III that notched Izod impact strength (23° C.) improvements in excess of 20% are commensurate with minimal losses (under about 5%) in 1% secant flexural modulus when the amount of Modifier B, expressed as a percent of total modification (rubber phase plus Modifier B) is less than about 14%.

TABLE IV

| MATERIAL | MODIFIER B AS % TOTAL MODIFICATION | IZOD % IMPROVEMENT 23° C. | SEC. MOD. % LOSS |
|---|---|---|---|
| 35SM | 6.7 | 45.3 | 2.5 |
| 35WM2 | 6.7 | 23.8 | 3.2 |
| 35WM3 | 9.7 | 43.7 | 5.1 |
| 513 | 9.7 | 21.2 | -2.6 |
| 513A | 9.7 | 109.8 | 0.6 |
| 47PM | 12 | 253.7 | 0.7 |
| 49PM | 16 | 14.4 | 9.6 | melt temperature of 230° C. Injection moldings were conducted on an Arburg Model 221-55-250, using ASTM molding conditions. Test specimens were generally conditioned about three weeks at 23° C. and 50% relative humidity before testing.

It is seen in TABLE V that with room temperature notched Izod impact that at higher impact, Modifier B (3% w) is more effective than half as much of SEBS-1 alone. This implies that the LLDPE-1 is imparting beneficial performance over and above that of the SEBS-1 alone. At a lower level of Modifier B, e.g., 2% w, its performance is about twice that of 1% SEBS-1. Thus, at the lower level, SEBS-1, either alone or as 50% w of Modifier B, appears to be the primary contributor to performance. Any effect of additive addition mode appears small for this test.

With low temperature notched Izod (-20° C.), formulations with SEBS-1 alone are generally better than Modifier B, and there may be a small effect of additive addition mode on results, with the pre-blending of Modifier B with stabilizers being possibly less effective.

In the Gardner impact test, roughly comparable results for Modifier B and SEBS-1 were obtained. The data do not allow a definitive conclusion regarding the relative benefit of one versus the other. No effect of additive blending mode was seen.

The 1% secant modulus for 1% w SEBS-1 is comparable to 2% w Modifier B, and a similar comparison can be made between 1.5% w SEBS-1 and 3% w Modifier B. Depending on the impact requirements of the application of interest, this offset may be compensated for by the generally higher notched Izod impact of SEBS-1 relative to Modifier B on the basis of equivalent modifier level. The pre-blending of modifiers and stabilizers appeared to possibly have an adverse effect on stiffness.

The stress whitening resistance of Modifier B at 3% w is better than that of 1.5% SEBS-1. This implies a benefit due to the presence of LLDPE-1 in addition to that of the SEBS-1 in Modifier B. However, at lower modification, the reverse may be true. Blending mode effects were mixed, and possibly insignificant in this test.

EXAMPLE IV

In this Example, the performance attributes of SEBS-1 and two commercially available ethylene-propylene rubber materials, denoted EPR-1 and EPR-2, were compared in formulations based on two base impact copolymers of this invention. Pertinent descriptive information is included in TABLE VI.

TABLE VII includes the pertinent mechanical properties and the stress whitening resistance results. Modifier comparisons are made at modification levels of 0.5, 1.0 and 2.0% w in both PP-8 and PP-9. The mechanical properties tabulation shows the overall superiority of SEBS-1 over EPR-1 and EPR-2. In general, notched impact strength for SEBS-1 modification was best, followed by EPR-2 and last by EPR-1. SEBS-1 was best for weld line strength (measured as elongation to break on double-gated tensile bars), with improvement seen for increasing SEBS-1 level with both base polymers, while with either EPR-1 or EPR-2, little if any consistent improvement in weld line strength was seen. With Gardner falling weight impact strength, SEBS-1 was better than EPR-1 or EPR-2 in PP-8 as the base polymer, and better than EPR-1 in PP-9, while being comparable to EPR-2 in PP-9. In stiffness-related properties (tensile and flexural properties), SEBS-1 modification was either comparable to EPR-1 or EPR-2 or superior, as in regard to the balance of tensile yield strength and tensile break elongation, the latter being a common measure of general ductility and toughness. The highest tensile break elongation values were provided by SEBS-1 modification, while at the same time high tensile yield strength was maintained.

TABLE V

MODIFIED POLYPROPYLENE COPOLYMERS

| Sample # | Blend # | Melt Flow dg/min | 23° C. Notched Izod (ft-lb/in) | −20° C. Notched Izod (ft-lb/in) | −30° C. Gardner Impact (in-lb) | 1% Secant Flexural Modulus (psi) | Tangent Flexural Modulus (psi) | Stress Whitening (10 in-lb) Diameter (in) | Stress Whitening (20 in-lb) Diameter (in) |
|---|---|---|---|---|---|---|---|---|---|
|  | PP-7 | 8.0 | 2.4 | 0.71 | 184 | 152,377 | 158,592 | 0.39 | 0.54 |
| IA# | 2.0% Modifier B/PP-7 | 8.0 | 3.3 | 0.75 | 247 | 147,174 | 152,718 | 0.38 | 0.50 |
| IB# | 3.0% Modifier B/PP-7 | 8.1 | 4.1 | 0.79 | 259 | 145,192 | 150,888 | 0.36 | 0.47 |
| IIA# | 1.0% SEBS-1/PP-7 | 7.9 | 3.2 | 0.85 | 255 | 146,398 | 152,431 | 0.38 | 0.49 |
| IIB# | 1.5% SEBS-1/PP-7 | 7.8 | 3.6 | 0.85 | 252 | 145,079 | 150,524 | 0.37 | 0.50 |
| IIC# | 2.0% SEBS-1/PP-7 | 8.0 | 4.1 | 0.82 | 250 | 141,799 | 147,490 | 0.36 | 0.49 |
| III## | 3.0% Modifier B/PP-7 | 7.9 | 4.4 | 0.75 | 256 | 140,200 | 146,082 | 0.35 | 0.46 |
| IV## | 1.5% SEBS-1/PP-7 | 8.0 | 3.4 | 0.81 | 248 | 143,205 | 148,989 | 0.37 | 0.49 |

SEBS-1 and PP-7 blended together then stabilizers added
SEBS-1 and stabilizers blended together and then blended into PP-7

TABLE VI

| COMPONENT | DESCRIPTION |
|---|---|
| SEBS-1 | See TABLE I |
| EPR-1 | Mooney Viscosity ML (1 + 4) 125° C. = 43 |
| EPR-2 | Mooney Viscosity ML (1 + 4) 125° C. = 56 |
| PP-8 | Fraction Rubber: 27% w; |
|  | Fraction Ethylene in Rubber: 80% w (FTIR) |
| PP-9 | Fraction Rubber: 34% w; |
|  | Fraction Ethylene in Rubber: 80% w (FTIR) |

Finally, a comparison of compositions containing EPR-1 and EPR-2 indicates that compositions modified by EPR-2 had better performance, thereby showing that compositions having an ethylene-propylene rubber modifier having a Mooney viscosity [ML (1+4) 125° C.] of greater than 50, preferably from 50 to 60 and more preferably from 54 to 58, provide superior properties compared to compositions modified by ethylene-propylene rubber modifiers of lower Mooney viscosity.

TABLE VII

| | SAMPLE # | | | | | | | | | |
|---|---|---|---|---|---|---|---|---|---|---|
| | 1 | 2 | 3 | 4 | 5 | 6 | 7 | 8 | 9 | 10 |
| BASE PP | PP-8 | PP-8 | PP-8 | PP-8 | PP-8 | PP-8 | PP-8 | PP-8 | PP-8 | PP-8 |
| MODIFIER | 0 | SEBS-1 | SEBS-1 | SEBS-1 | EPR-1 | EPR-1 | EPR-1 | EPR-2 | EPR-2 | EPR-2 |
| % MODIFIER | 0 | 0.5% | 1.0% | 2.0% | 0.5% | 1.0% | 2.0% | 0.5% | 1.0% | 2.0% |
| MELT FLOW (g/10 min.) | 7.4 | 7.5 | 7.5 | 7.3 | 7.6 | 7.6 | 7.4 | 7.6 | 7.4 | — |
| TEN. YLD. STRENGTH (2 in/min.) (psi) | 3,964 | 3,932 | 3,881 | 3,793 | 3,926 | 3,862 | 3,814 | 3,927 | 3,842 | 3,767 |
| ELONG. YLD (2 in/min.) (%) | 7.34 | 7.32 | 7.30 | 7.40 | 7.33 | 7.31 | 7.28 | 7.35 | 7.36 | 7.50 |
| TEN. BRK. STRENGTH (2 in/min.) (%) | 1,862 | 1,574 | 1,906 | 1,654 | 1,475 | 1,693 | 956 | 1,151 | 1,824 | 1,234 |
| ELONG. BRK. (2 in/min.) (%) | 126 | 153 | 197 | 335 | 149 | 145 | 199 | 133 | 145 | 247 |
| FLEX MOD. (0.05 in/min) TAN. MOD. | 175,101 | 174,850 | 172,041 | 169,793 | 175,156 | 173,006 | 172,399 | 175,929 | 171,309 | 169,480 |
| FLEX MOD. (0.05 in/min.) 1% SEC. MOD. | 170,514 | 169,109 | 167,238 | 164,695 | 169,593 | 166,367 | 165,129 | 169,427 | 165,993 | 163,208 |
| IZOD (ft-lb/in) 23° C. notched | 1.20 | 1.29 | 1.32 | 1.69 | 1.02 | 1.06 | 1.23 | 1.17 | 1.20 | 1.35 |
| IZOD (ft-lb/in) −20° C. notched | 0.59 | 0.62 | 0.68 | 0.72 | 0.65 | 0.63 | 0.65 | 0.63 | 0.62 | 0.67 |
| GARDNER IMPACT (in-lb) −30° C. | 123.60 | 147.75 | 157.80 | 174.32 | 151.67 | 148.42 | 153.79 | 147.14 | 144.90 | 155.70 |
| WELD LINE STRENGTH DOUBLE-GATED TENSILE @ 5 in/min ELONG. BRK. (%) | 3.54 | 3.64 | 3.84 | 4.47 | 3.45 | 3.41 | 3.40 | 3.43 | 3.40 | 3.42 |
| GLOSS @ 60° | 81.10 | 82.80 | 82.90 | 80.60 | 82.40 | 80.50 | 82.80 | 82.00 | 81.10 | 81.60 |
| GLOSS @ 45° | 46.40 | 46.90 | 47.20 | 46.20 | 46.70 | 46.10 | 47.00 | 46.30 | 46.10 | 46.60 |
| SW10 | 9.98 | 9.83 | 10.33 | 10.30 | 10.53 | 10.50 | 10.64 | 10.49 | 10.85 | 10.61 |
| SW20 | 12.80 | 12.13 | 12.68 | 12.70 | 13.01 | 12.89 | 13.16 | 12.55 | 12.95 | 13.25 |

| | SAMPLE # | | | | | | | | | |
|---|---|---|---|---|---|---|---|---|---|---|
| | 11 | 12 | 13 | 14 | 15 | 16 | 17 | 18 | 19 | 20 |
| BASE PP | PP-9 | PP-9 | PP-9 | PP-9 | PP-9 | PP-9 | PP-9 | PP-9 | PP-9 | PP-9 |
| MODIFIER | 0 | SEBS-1 | SEBS-1 | SEBS-1 | EPR-1 | EPR-1 | EPR-1 | EPR-2 | EPR-2 | EPR-2 |
| % MODIFIER | 0 | 0.5% | 1.0% | 2.0% | 0.5% | 1.0% | 2.0% | 0.5% | 1.0% | 2.0% |
| MELT FLOW (g/10 min.) | 6.3 | 6.4 | 6.4 | 6.2 | 6.4 | 6.4 | 6.4 | 6.5 | 6.2 | 6.1 |
| TEN. YLD. STRENGTH (2 in/min.) (psi) | 3,616 | 3,616 | 3,617 | 3,527 | 3,553 | 3,596 | 3,547 | 3,658 | 3,538 | 3,471 |
| ELONG. YLD (2 in/min.) (%) | 9.38 | 9.50 | 9.08 | 8.94 | 9.10 | 8.55 | 9.06 | 8.92 | 9.09 | 9.14 |
| TEN. BRK. STRENGTH (2 in/min.) (%) | 2,596 | 2,606 | 2,641 | 2,767 | 2,673 | 2,507 | 2,555 | 2,475 | 2,630 | 2,677 |
| ELONG. BRK. | 171 | 268 | 287 | 370 | 312 | 214 | 261 | 174 | 284 | 344 |

TABLE VII-continued

| | | | | | | | | | | |
|---|---|---|---|---|---|---|---|---|---|---|
| (2 in/min.) (%) | | | | | | | | | | |
| FLEX MOD. (0.05 in/min) TAN. MOD. | 156,530 | 154,649 | 151,239 | 147,614 | 152,834 | 154,474 | 150,629 | 152,850 | 147,777 | 148,965 |
| FLEX MOD. (0.05 in/min.) 1% SEC. MOD. | 150,128 | 149,535 | 146,292 | 143,337 | 148,368 | 147,558 | 144,390 | 147,826 | 142,799 | 143,341 |
| IZOD (ft-lb/in) 23° C. notched | 2.02 | 2.35 | 2.81 | 3.80 | 2.14 | 2.29 | 2.41 | 2.16 | 2.14 | 2.66 |
| IZOD (ft-lb/in) −20° C. notched | 0.64 | 0.70 | 0.74 | 0.73 | 0.67 | 0.63 | 0.65 | 0.67 | 0.66 | 0.70 |
| GARDNER IMPACT (in-lb) −30° C. | 196.62 | 229.76 | 229.89 | 230.84 | 215.05 | 218.70 | 228.00 | 225.60 | 231.00 | 228.90 |
| WELD LINE STRENGTH DOUBLE-GATED TENSILE @ 5 in/min ELONG. BRK. (%) | 3.27 | 3.53 | 3.80 | 4.58 | 3.22 | 2.84 | 3.48 | 3.34 | 3.52 | 3.79 |
| GLOSS @ 60° | 85.60 | 85.50 | 84.90 | 84.90 | 85.00 | 85.00 | 85.30 | 85.20 | 85.10 | 85.00 |
| GLOSS @ 45° | 49.60 | 49.40 | 49.00 | 49.20 | 49.30 | 49.40 | 49.50 | 49.50 | 49.50 | 49.40 |
| SW10 | 9.23 | 9.14 | 9.26 | 9.35 | 9.58 | 9.75 | 9.55 | 9.61 | 9.82 | 9.75 |
| SW20 | 11.53 | 11.44 | 11.65 | 12.05 | 11.82 | 12.23 | 12.09 | 11.97 | 12.20 | 12.12 |

What is claimed is:

1. A composition comprising:
   a) a base polypropylene impact copolymer comprising a homopolymer phase of predominantly homopolymeric polypropylene and a copolymer phase comprising an ethylene-propylene copolymer, wherein the copolymer phase contains from about 77% to about 90% by weight ethylene based on the total copolymer phase, and
   b) a modifier comprising a hydrogenated block copolymer having at least one polymeric block containing predominantly polymerized monoalkenyl aromatic hydrocarbon monomer units and at least one polymeric block containing predominantly polymerized conjugated diolefin monomer units, wherein the modifier is present in an amount of about 0.3 to about 10% by weight of the base polypropylene impact copolymer; wherein the composition has an SW10 of less than about 0.45 inch and SW20 of less than about 0.60 inch, wherein SW10 is the diameter of the white spot on the opposite side of a 2.5 inch diameter by 0.125 inch thick disk which is measured 24 hours after molding based on 10 in-lb of impact, Gardner ring out, and SW20 is the same as SW10 except at 20 in-lb of impact.

2. A composition according to claim 1 wherein the modifier further comprises a polyethyleneic ethylene α-olefin copolymer.

3. A composition according to claim 1 wherein the copolymer phase is from about 20% to about 50% by weight of the base polypropylene impact copolymer.

4. A composition according to claim 1 wherein the modifier is present in an amount of about 0.5 to about 4% by weight of the base polypropylene impact copolymer.

5. A composition according to claim 1 wherein the modifier consists essentially of the hydrogenated block copolymer.

6. A composition according to claim 1 wherein the copolymer phase contains about 79% to about 85% by weight ethylene based on the total copolymer phase.

7. A composition according to claim 1 wherein the modifier contains about 30% to about 70% by weight of the block copolymer.

8. A composition according to claim 2 wherein the polyethyleneic ethylene-α-olefin is a copolymer or terpolymer of ethylene and one or more olefins having 3 to 12 carbon atoms.

9. A composition according to claim 8 wherein the polyethyleneic ethylene-α-olefin is an ethylene-butene-1 copolymer or an ethylene-hexene-1 copolymer.

10. A composition according to claim 8 wherein the polyethyleneic ethylene-α-olefin is LLDPE.

11. A composition according to claim 8 wherein the polyethyleneic ethylene-α-olefin is VLDPE or ULDPE.

12. A composition according to claim 8 wherein the polyethyleneic ethylene-α-olefin is prepared using a metallocene catalyst.

13. A composition according to claim 1 wherein the base polypropylene impact copolymer is visbroken.

14. A composition according to claim 1 wherein the composition is visbroken.

15. A composition according to claim 8 wherein the polyethyleneic ethylene-α-olefin has a density of less than 0.930 g/cc.

16. A product of a process comprising the step of blending
   a) a base polypropylene impact copolymer comprising a homopolymer phase of predominantly homopolymeric polypropylene and a copolymer phase comprising an ethylene-propylene copolymer, wherein the copolymer phase contains from about 77% to about 90% by weight ethylene based on the total copolymer phase, and
   b) a modifier comprising a hydrogenated block copolymer having at least one polymeric block containing predominantly polymerized monoalkenyl aromatic hydrocarbon monomer units and at least one polymeric block containing predominantly polymerized conjugated diolefin monomer units, wherein the modifier is added in an amount of about 0.3 to about 10% by weight of the base polypropylene impact copolymer; wherein the composition has an SW10 of less than about 0.45 inch and SW20 of less than about 0.60 inch, wherein SW10 is the diameter of the white spot on the opposite side of a 2.5 inch diameter by 0.125 inch thick disk which is measured 24 hours after molding based on 10 in-lb of impact, Gardner ring out, and SW20 is the same as SW10 except at 20 in-lb of impact.

17. A product according to claim 16, wherein the process further comprises extruding the components (a) and (b).

18. A product according to claim 16, wherein the process further comprises visbreaking the base polypropylene impact copolymer.

19. A product according to claim 16, wherein the process further comprises visbreaking the composition.

20. The product according to claim 16, wherein the modifier further comprises a polyethyleneic ethylene α-olefin copolymer.

21. The product according to claim 16, wherein the copolymer phase is from about 20% to about 50% by weight of the base polypropylene impact copolymer.

22. A composition comprising:
a) a base polypropylene impact copolymer comprising a homopolymer phase of predominantly homopolymeric polypropylene and a copolymer phase comprising an ethylene-propylene copolymer, wherein the copolymer phase contains from about 77% to about 90% by weight ethylene based on the total copolymer phase, and
b) a modifier comprising an ethylene-propylene rubber having a Mooney viscosity [ML(1+4) 125° C.] of greater than 50; wherein the composition has an SW10 of less than about 0.45 inch and SW20 of less than about 0.60 inch, wherein SW10 is the diameter of the white spot on the opposite side of a 2.5 inch diameter by 0.125 inch thick disk which is measured 24 hours after molding based on 10 in-lb of impact, Gardner ring out, and SW20 is the same as SW10 except at 20 in-lb of impact.

23. A composition according to claim 22, wherein the ethylene-propylene rubber has a Mooney viscosity [ML (1+4) 125° C.] of from 50 to 60.

24. A composition comprising:
a base polypropylene impact copolymer comprising a homopolymer phase of predominantly homopolymeric polypropylene and a copolymer phase comprising an ethylene-propylene copolymer, wherein the copolymer phase is from about 20% to about 50% of the base polypropylene impact copolymer and the copolymer phase contains from about 77% to about 90% by weight ethylene based on the total copolymer phase; wherein the composition has an SW10 of less than about 0.45 inch and SW20 of less than about 0.60 inch, wherein SW10 is the diameter of the white spot on the opposite side of a 2.5 inch diameter by 0.125 inch thick disk which is measured 24 hours after molding based on 10 in-lb of impact, Gardner ring out, and SW20 is the same as SW10 except at 20 in-lb of impact.

* * * * *